United States Patent
Woo et al.

(10) Patent No.: US 6,735,223 B1
(45) Date of Patent: May 11, 2004

(54) METHOD OF CONTROLLING OFFSET OF TIME STAMP AND APPARATUS FOR TRANSMITTING PACKET USING THE SAME

(75) Inventors: Sung-gab Woo, Seoul (KR); Goan-soo Seong, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 632 days.

(21) Appl. No.: 09/698,137

(22) Filed: Oct. 30, 2000

(30) Foreign Application Priority Data

Oct. 29, 1999 (KR) .......................................... 99-47512

(51) Int. Cl.$^7$ ................................................. H04J 3/04
(52) U.S. Cl. ....................................... 370/516; 370/517
(58) Field of Search ............................... 370/471, 349, 370/356, 506, 516–518, 487, 395.1

(56) References Cited

U.S. PATENT DOCUMENTS

| | | | |
|---|---|---|---|
| 5,534,937 A | * | 7/1996 | Zhu et al. .................... 370/506 |
| 5,790,543 A | * | 8/1998 | Cloutier .................... 370/395.1 |
| 5,805,602 A | * | 9/1998 | Cloutier et al. ............. 370/516 |
| 5,914,962 A | * | 6/1999 | Fimoff et al. ............... 370/516 |
| 6,405,275 B1 | * | 6/2002 | Morrow et al. ............. 370/487 |
| 6,504,838 B1 | * | 1/2003 | Kwan .......................... 370/516 |
| 6,678,267 B1 | * | 1/2003 | Anandakumar et al. .... 370/356 |
| 6,574,213 B1 | * | 6/2003 | Anandakumar et al. .... 370/349 |

FOREIGN PATENT DOCUMENTS

| | | |
|---|---|---|
| JP | 9-46390 | 2/1997 |
| JP | 10-41915 | 2/1998 |
| WO | 11-355230 | 12/1999 |

* cited by examiner

Primary Examiner—Salvatore Cangialosi
(74) Attorney, Agent, or Firm—Sughrue Mion, PLLC

(57) ABSTRACT

A method for setting the offset of a time stamp, in which the offset value that is added to the time stamp is automatically controlled according to a transmission window value in a packetizing system for a high speed serial bus, and an apparatus therefor are provided. An apparatus for transmitting a packet in a packetizing system for a high speed serial bus includes an adder for generating a time stamp value by adding a cycle time value which is a data segmentation size to an offset value in consideration of data delay time and/or the amount of jitter, a memory for storing the input data according to the time stamp in units of packets, a window generator for estimating the time stamp value generated by the adder and determining a transmission time range, and a controller for adding the time stamp generated by the adder to the data in units of packets, which are stored in the memory, outputting the data in units of packets, to which the time stamp is added, and controlling the offset value when overflow generated by read and write timing errors is detected in the memory.

5 Claims, 3 Drawing Sheets

METHOD OF CONTROLLING OFFSET OF TIME STAMP AND APPARATUS FOR TRANSMITTING PACKET USING THE SAME

BACKGROUND OF THE INVENTION

1. Field of the Invention

The present invention relates to a packetizing system for a high speed serial bus, and more particularly, to a method of automatically controlling an offset value added to a time stamp according to a transmission window value in the packetizing system for the high speed serial bus and an apparatus for transmitting a packet using the same.

2. Description of the Related Art

In general, a time stamp is temporal information that indicates when video and audio data must be decoded and reproduced at every unit of decoding and reproduction referred to as the access unit of video and audio data.

When real time data is transmitted on a high speed serial bus, such as the IEEE-1394 bus, a packetizing apparatus segments a source transmission stream, inserts a time stamp into the segmented source transmission streams, and outputs packet data. At this time, the packet output time is determined by the time stamp.

FIG. 1 is a block diagram showing an apparatus for setting an offset of the time stamp in a conventional packetizing system for a high speed serial bus.

A timer 110 generates a unique cycle time value related to a contact device. The cycle starts every 125 μsec. An offset generator 120 generates an offset value depending on a data delay time and an amount of jitter, which is set to be a certain value by a user.

An adder 116 adds the timer value generated by the timer 110 to the offset value generated by the offset generator 120 and thus, generates the time stamp. A controller (not shown) inserts the time stamp into the data stored in a memory 130 and outputs the data to a transmitter 140. The transmitter 140 transmits data in units of packets to a receiver regardless of the time stamp.

In the conventional packetizing system, an application engineer sets an appropriate offset value and adds the offset value to the time stamp.

However, when the offset value added to the time stamp is not correct, there is an overflow in the memory 130 due to read and write timing errors. Accordingly, some data items may be lost or corrupted.

SUMMARY OF THE INVENTION

To solve the above problem, it is an object of the present invention to provide a method for controlling the offset of a time stamp, which is capable of effectively using bus bandwidth by automatically setting the offset value added to the time stamp in a packetizing system for a high speed serial bus.

It is another object of the present invention to provide an apparatus for transmitting a packet, to which the method for controlling the offset of the time stamp is applied.

To achieve the first object, there is provided an apparatus for transmitting a packet in a packetizing system for a high speed serial bus, comprising an adder for generating a time stamp value by adding a cycle time value which is a data segmentation size to an offset value in consideration of data delay time and/or the amount of jitter, a memory for storing the input data according to the time stamp in units of packets, a window generator for estimating the time stamp value generated by the adder and determining a transmission time range, and a controller for adding the time stamp generated by the adder to the data in units of packets, which are stored in the memory, outputting the data in units of packets, to which the time stamp is added, and controlling the offset value when overflow generated by read and write timing errors is detected in the memory.

To achieve the second object, there is provided a method for controlling the offset of a time stamp in a packetizing system for a high speed serial bus, comprising the steps of (a) setting a time stamp that is a unit of decoding and reproduction by adding an offset value in consideration of data delay time and the amount of jitter to packet data, (b) sequentially outputting data in units of packets according to the time stamp set in the step (a), (c) determining the range of time, at which data is to be transmitted, by estimating a time stamp in the data in units of packets, which are output in the step (b), and transmitting data in units of packets within the range, and (d) reducing or increasing the offset value when overflow is detected due to read and write timing errors when the data is transmitted in the step (c).

BRIEF DESCRIPTION OF THE DRAWING(S)

The above objects and advantages of the present invention will become more apparent by describing in detail a preferred embodiment thereof with reference to the attached drawings in which.

DESCRIPTION OF THE PREFERRED EMBODIMENTS

Figure 1:
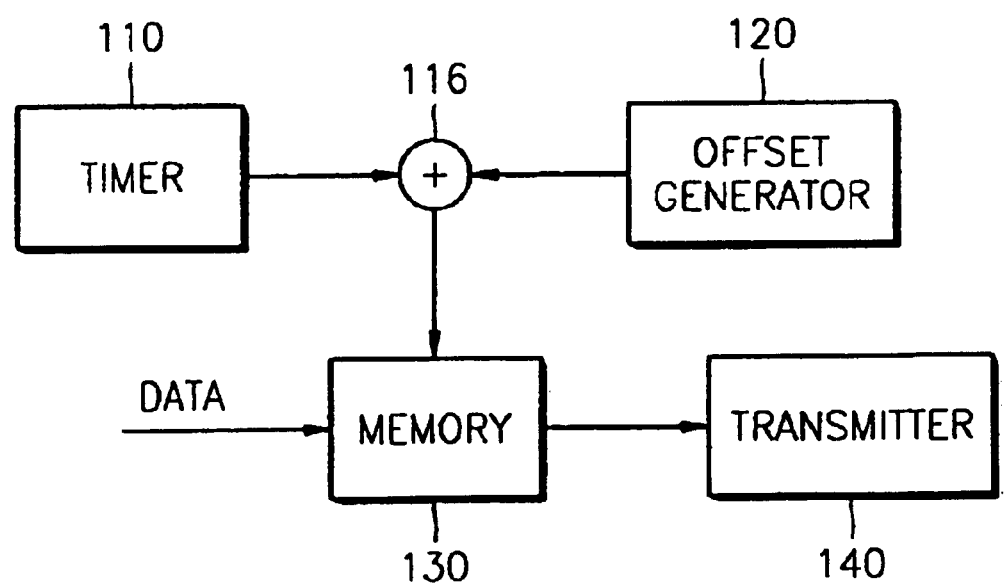
FIG. 1 is a block diagram illustrating a conventional packetizing system for a high speed serial bus.
Figure 2:
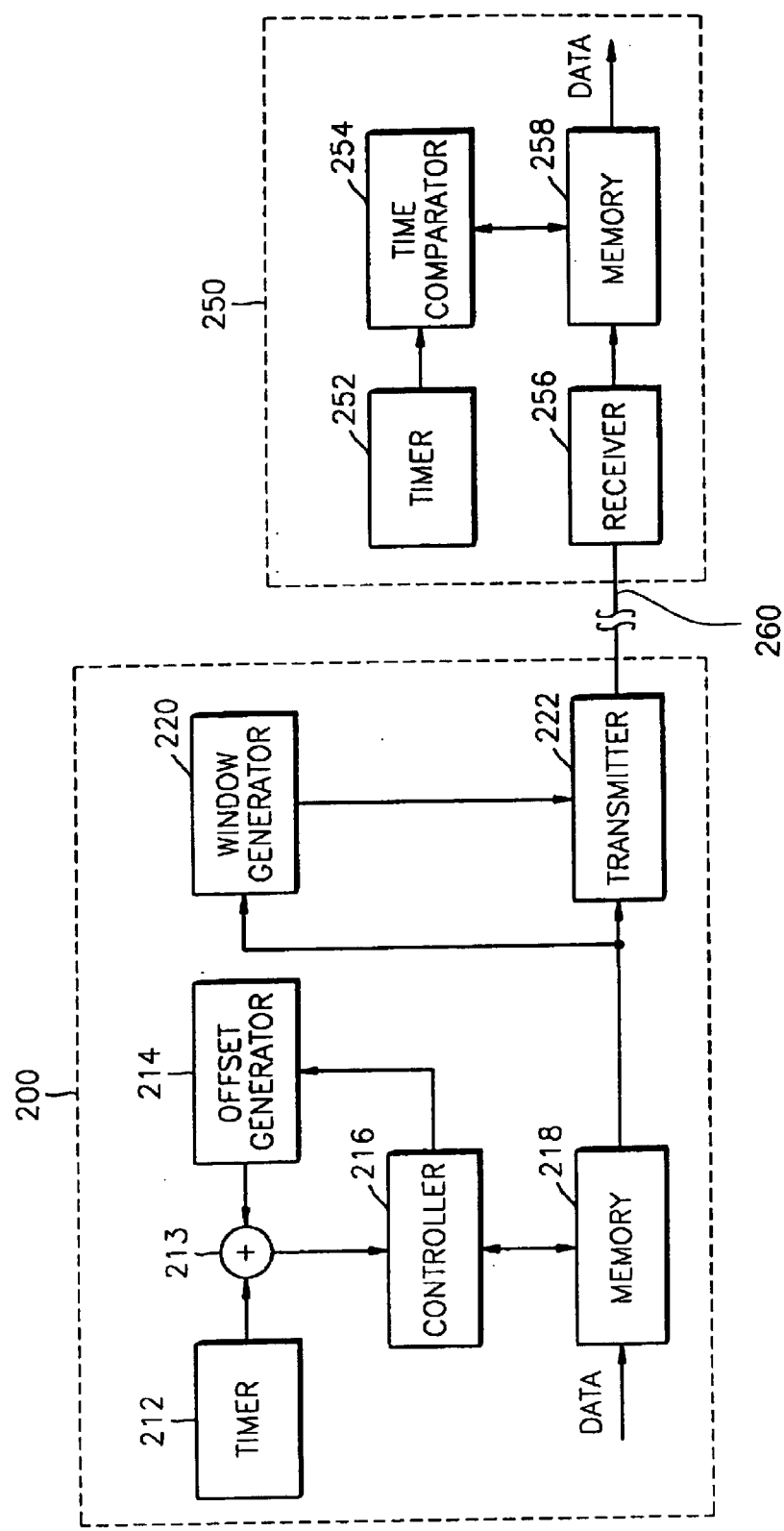
FIG. 2 is a block diagram illustration a packetizing system for a high speed serial bus according to the present invention.

FIG. 2 is a block diagram illustrating a packetizing system for a high speed serial bus according to the present invention.

A transmitting apparatus 200 and a receiving apparatus 250 are connected to each other by an IEEE 1394 bus 260. The transmitting apparatus 200 includes a timer 212, an adder 213, an offset generator 214, a controller 216, a memory 218, a window generator 220, and a transmitter 222. The transmitting apparatus 200 transmits packet data, in which a time stamp is set. The receiving apparatus 250 includes a receiver 256, a timer 252, a time comparator 254, and a memory 258. The receiving apparatus 250 correctly recovers packet data according to the time stamp.

In the present embodiment, it is assumed that the system of FIG. 2 is a packetizing system for a high speed serial bus adhering to the IEEE-1394 specification and the IEC-61883 specification.

In the transmitting apparatus 200, a segmentation size of a bit stream is determined with reference to a bit rate of an input transmission stream. The timer 212 generates a cycle time value according to the segmentation size.

The adder 213 adds the cycle time value generated by the timer 212 to the offset value generated by the offset generator 214 to generate a time stamp value. The time stamp denotes the time at which a first byte arrives among data in units of packets. The offset value is set to be a uniform value in consideration of data delay time, that is, a duration between the time at which the packet data is input to the transmitting apparatus 200 to the time at which the packet data is output to the receiving apparatus 250, and the amount of jitter.

Therefore, the controller 216 inserts the time stamp value generated by the adder 213 into the packet data stored in the memory 218 and outputs the packet data to the transmitter 222. Here, the memory 218 is of the first-in-first-out (FIFO) type, which temporarily stores an input transport bitstream of the MPEG specification. The window generator 220 estimates the time stamp value from the data generated by the memory 218, determines a window value corresponding to a transmission time range, and applies the window value to the transmitter 222. The transmitter 222 transmits the packet data including the time stamp within the range of a window generated by the window generator 220. When the offset value set in an earlier stage during the transmission of the data is small or large, the time stamp is not inserted with good timing. Accordingly, there is an overflow in the memory 218.

When an overflow is detected in the memory 218, the controller 216 changes the offset value by applying a control signal to the offset generator 214 and generates a time stamp according to the controlled offset value. Accordingly, the window generator 220 estimates a new time stamp value output by the memory 218, determines the transmission time range (the window), and applies the window value to the transmitter 222. The transmitter 222 transmits data on the IEEE-1394 bus 260 in units of cycle starts that occur every 125 μsec within the range of the window generated by the window generator 220.

In the receiving apparatus 250, the receiver 256 receives the packet data received from the transmitting apparatus 200 through the IEEE-1394 bus 260 and temporarily stores the received packet data in the memory 258. The time comparator 254 compares the time stamp value of the packet data stored in the memory with the cycle timer value unique to a contact device, which is generated by the timer 252 and reads the data from the memory 258 in units of packets when the time stamp value is equal to the cycle timer value.

Figure 3:
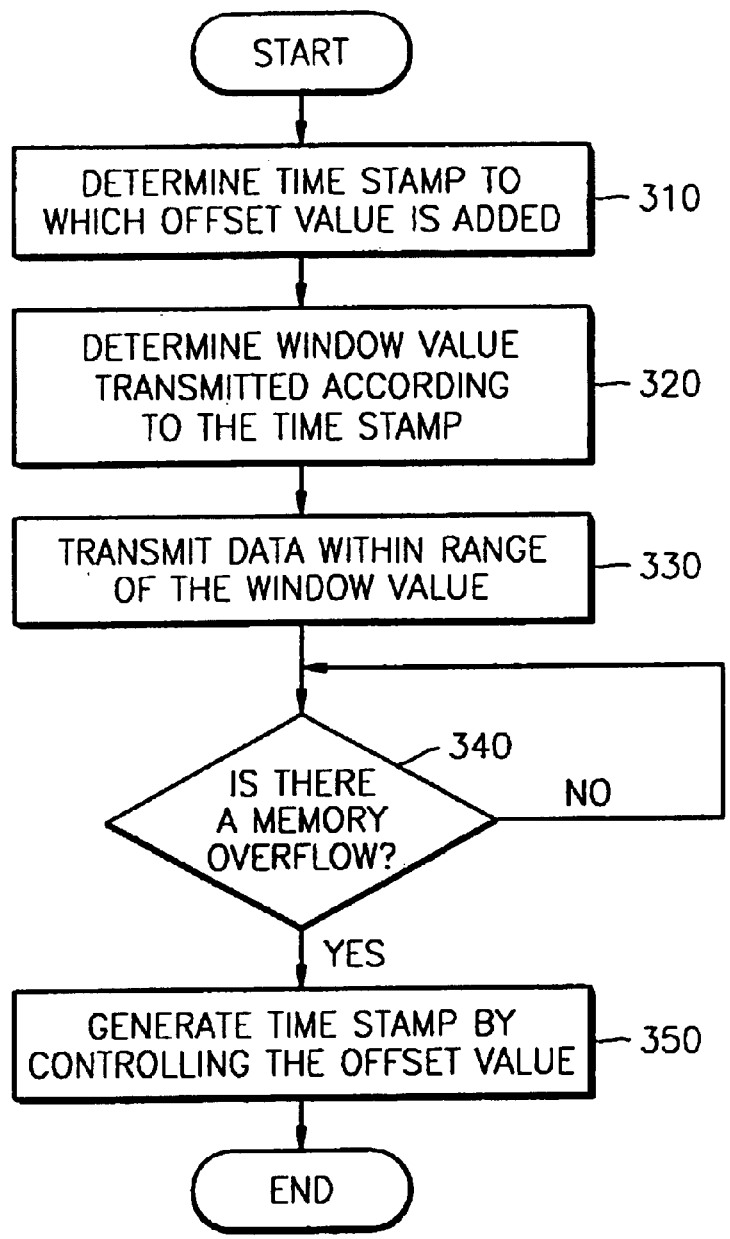
FIG. 3 is a flowchart illustrating a method for setting the offset of a time stamp according to the present invention.

FIG. 3 is a flowchart illustration a method for setting the offset of a time stamp according to the present invention.

First, in step 310, a time stamp is set in consideration of the segmentation size and cycle time of the transmission stream in units of packets. (Here, an offset value, considering jitter and the difference between the time at which data is input to the transmitter and the time at which data is output to the receiver, is added to the time stamp.)

In step 320, a window value corresponding to the range of the time, at which data is to be transmitted, is determined with reference to the set time stamp value.

In step 330, data is transmitted in units of packets within the range of the window value.

In step 340, a determination is made as to whether there is an overflow in a memory space for buffering the data according to the time stamp.

In step 350, if there is an overflow in the memory, the offset value is reduced or increased since it is assumed that write and read timing errors occur in the memory because the offset value set in an earlier stage is small or large.

Therefore, according to the present invention, the time stamp value is added in consideration of the amount of jitter and the amount of memory when real time data is transmitted on a line with jitter.

While this invention has been particularly shown and described with reference to preferred embodiments thereof, it will be understood by those skilled in the art that various changes in form and details may be made therein without departing from the spirit and scope of the invention as defined by the appended claims. Namely, the present invention can be applied to an MPEG transmission system and a digital video home system as well as to the packetizing system for the high speed serial bus.

As mentioned above, according to the present invention, in the packetizing system for the high speed serial bus, it is possible to effectively use the bandwidth of a bus since the offset value of the time stamp is automatically controlled. Accordingly, since an application engineer does not have to consider the offset time of the time stamp, it becomes easier to design an application.

What is claimed is:

1. An apparatus for transmitting a packet in a packetizing system, comprising:
   an adder for generating a time stamp value by adding a cycle time value corresponding to a data segmentation size to an offset value which is set based on at least one of a data delay time and an amount of jitter;
   a memory for receiving and storing input data according to the time stamp in units of packets;
   a window generator for estimating the time stamp value generated by the adder and determining a transmission time range; and
   a controller for adding the time stamp generated by the adder to the input data in units of packets, which are stored in the memory, controlling the output of the input data in units of packets, to which the time stamp is added, from the memory, and controlling the offset value when overflow generated by read and write timing errors is detected in the memory.

2. The apparatus of claim 1, further comprising:
   a timer for generating the cycle time value according to the data segmentation size which is based on a bit rate of the input data; and
   an offset generator for generating the offset value receiving a control signal from the controller for controlling the offset value.

3. The apparatus of claim 3, further comprising a transmitter for receiving the transmission time range from the window generator and the input data in units output from the memory, and transmitting the input data in units of packets within the transmission time range.

4. A method for controlling the offset of a time stamp in a packetizing system, comprising the steps of:
   (a) determining a time stamp by adding an offset value, which is set in consideration of data delay time and the amount of jitter, to a cycle time;
   (b) adding the time stamp to data to be transmitted and sequentially outputting data in units of packets according to the time stamp set in the step (a);
   (c) determining a transmission time range at which the sata is to be transmitted according to the time stamp added to the data in units of packets, which are output in the step (b), and transmitting the data in units of packets within the transmission range; and
   (d) reducing or increasing the offset value when overflow is detected due to read and write timing errors when the data is transmitted in the step (c).

5. The method of claim 4, wherein the cycle time is determined according to a segmentation size based on a bit rate of a bit stream to be transmitted.

* * * * *